(12) United States Patent
Parrish

(10) Patent No.: US 8,613,276 B2
(45) Date of Patent: *Dec. 24, 2013

(54) DUAL FUEL GAS VALVE AND GAS GRILL

(76) Inventor: Daniel Parrish, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,423

(22) Filed: May 23, 2011

(65) Prior Publication Data

US 2012/0073560 A1 Mar. 29, 2012

Related U.S. Application Data

(63) Continuation of application No. 12/082,812, filed on Apr. 14, 2008, now Pat. No. 7,967,005.

(60) Provisional application No. 60/923,507, filed on Apr. 13, 2007.

(51) Int. Cl.
*F24C 3/12* (2006.01)

(52) U.S. Cl.
USPC ............. 126/42; 126/39 N; 126/1 R; 126/23; 126/52; 137/625.13; 137/625.15; 137/625.16; 137/625.19; 251/207; 251/209; 251/285; 251/309; 251/311

(58) Field of Classification Search
USPC ........... 251/207, 284, 285, 286, 287, 288, 60, 251/93; 126/39 N, 42, 52
See application file for complete search history.

(56) References Cited

U.S. PATENT DOCUMENTS

| | | | |
|---|---|---|---|
| 1,229,038 A | 6/1917 | Cornelius | |
| 1,498,985 A | 6/1924 | Van Deventer | |
| 1,639,115 A | 8/1927 | Smith | |
| 1,641,534 A | 9/1927 | Davis | |
| 1,707,007 A | 3/1929 | Harper | |
| 1,715,168 A | 5/1929 | McGee | |
| RE18,430 E | 4/1932 | Roberts | |
| 1,982,101 A | 1/1934 | Herbster | |
| 1,964,287 A | 6/1934 | Harper | |
| 2,095,064 A | 10/1937 | Harper | |
| 2,113,027 A | 4/1938 | Kindl et al. | |
| 2,120,864 A | 6/1938 | Kagi | |
| 2,161,523 A | 6/1939 | Moecker, Jr. et al. | |
| 2,244,237 A * | 6/1941 | Belknap | 237/63 |
| 2,257,880 A | 10/1941 | Harper | |
| 2,260,474 A | 10/1941 | Mueller | |
| 2,838,641 A | 2/1945 | Focke et al. | |
| 2,540,056 A | 1/1951 | Robinson | |
| 2,583,959 A * | 1/1952 | Mueller | 137/599.18 |
| 2,590,535 A | 3/1952 | Harper | |
| 2,634,949 A | 4/1953 | Robinson | |
| 2,652,225 A * | 9/1953 | Peterson et al. | 251/91 |
| 2,723,102 A | 11/1955 | Mueller | |
| 2,747,613 A | 5/1956 | Reinhart | |
| 2,804,524 A | 8/1957 | Dahlen | |

(Continued)

*Primary Examiner* — Kenneth Rinehart
*Assistant Examiner* — Jorge Pereiro
(74) *Attorney, Agent, or Firm* — Robert D. McCutcheon

(57) ABSTRACT

A duel fuel gas control valve controls the supply of gas (e.g., natural gas or liquid propane gas) to a gas grill. The duel fuel gas control valve is structured to control either natural or LP gas flow at the desired operating characteristics based on conventional gas supply characteristics and gas grill requirements. A restrictor mechanism, when in first and second configurations, respectively, restricts movement of the valve core to a first predetermined range for a first mode of operation (first type of gas supply) and to a second predetermined range for a second mode of operation (second type of gas supply).

14 Claims, 13 Drawing Sheets

(56) References Cited

U.S. PATENT DOCUMENTS

| | | | |
|---|---|---|---|
| 2,832,409 A | 4/1958 | Lee, Sr. et al. | |
| 2,855,955 A | 10/1958 | Lamar | |
| 2,893,426 A | 7/1959 | Brumbaugh | |
| 2,912,881 A | 11/1959 | Imhoff | |
| 2,963,042 A | 12/1960 | Dolby et al. | |
| 2,984,256 A | 5/1961 | Wildern | |
| 3,001,547 A | 9/1961 | Brumbaugh | |
| 3,014,748 A * | 12/1961 | Welch et al. | 292/356 |
| 3,154,095 A | 10/1964 | Cleminshaw et al. | |
| 3,443,591 A | 5/1969 | Blanzy et al. | |
| 3,505,884 A | 4/1970 | Ford et al. | |
| 3,564,929 A | 2/1971 | Halstead | |
| 3,747,629 A | 7/1973 | Bauman | |
| 3,769,933 A | 11/1973 | Fox | |
| 3,814,120 A * | 6/1974 | Moen | 137/242 |
| 3,831,621 A | 8/1974 | Anthony et al. | |
| 3,903,383 A | 9/1975 | Marker | |
| 4,005,728 A * | 2/1977 | Thorp | 137/270 |
| 4,020,870 A | 5/1977 | Carlson | |
| 4,095,747 A | 6/1978 | Anderson | |
| 4,175,220 A | 11/1979 | Johnston et al. | |
| 4,355,544 A | 10/1982 | Post | |
| 4,397,330 A | 8/1983 | Hayman | |
| 4,443,137 A | 4/1984 | Albrent et al. | |
| 4,546,219 A | 10/1985 | Rose | |
| 4,606,371 A | 8/1986 | Maekawa | |
| 4,718,448 A * | 1/1988 | Love et al. | 137/271 |
| 4,787,216 A | 11/1988 | Chesnut et al. | |
| 4,901,749 A | 2/1990 | Hutto | |
| 5,027,854 A | 7/1991 | Genbauffe | |
| 5,067,758 A * | 11/1991 | Fann et al. | 292/347 |
| 5,365,978 A | 11/1994 | Woods | |
| 5,398,717 A | 3/1995 | Goncze | |
| 5,435,343 A | 7/1995 | Buezis | |
| 5,653,220 A | 8/1997 | Velie et al. | |
| 5,832,952 A | 11/1998 | Cook et al. | |
| 5,904,336 A | 5/1999 | Niakan et al. | |
| 5,975,135 A * | 11/1999 | Aguirre-Esponda et al. | 137/599.17 |
| 6,068,017 A | 5/2000 | Haworth et al. | |
| 6,131,562 A | 10/2000 | Schlosser et al. | |
| 6,162,048 A | 12/2000 | Griffioen et al. | |
| 6,170,507 B1 | 1/2001 | Dalton et al. | |
| 6,283,153 B1 * | 9/2001 | Brisco et al. | 137/625.47 |
| 6,532,943 B1 | 3/2003 | Yudanov | |
| 6,588,864 B1 | 7/2003 | Moretti | |
| 6,726,175 B1 * | 4/2004 | Saba et al. | 251/209 |
| 6,727,449 B2 | 4/2004 | Spiegel et al. | |
| 6,755,947 B2 | 6/2004 | Schulze et al. | |
| 6,880,571 B2 * | 4/2005 | Lin | 137/599.17 |
| 7,000,896 B2 * | 2/2006 | Gross | 251/285 |
| 7,156,370 B2 | 1/2007 | Albizuri | |
| 7,171,727 B2 | 2/2007 | Wylie et al. | |
| 7,331,359 B2 | 2/2008 | Shay | |
| 7,458,386 B2 | 12/2008 | Zhang | |
| 7,461,669 B2 | 12/2008 | Jonte et al. | |
| 7,600,529 B2 | 10/2009 | Querejeta | |
| 7,641,470 B2 | 1/2010 | Albizuri | |
| 7,651,330 B2 | 1/2010 | Albizuri | |
| 7,766,028 B2 | 8/2010 | Massengale et al. | |
| 7,849,877 B2 * | 12/2010 | Tan et al. | 137/625.46 |
| 8,011,920 B2 * | 9/2011 | Deng | 431/12 |
| 8,152,515 B2 * | 4/2012 | Deng | 431/354 |
| 8,241,034 B2 * | 8/2012 | Deng | 431/278 |
| 8,297,968 B2 * | 10/2012 | Deng | 431/278 |
| 2002/0171336 A1 | 11/2002 | Moretti | |
| 2003/0007909 A1 | 1/2003 | Schulze et al. | |
| 2003/0141175 A1 | 7/2003 | Spiegel et al. | |
| 2004/0089830 A1 | 5/2004 | Beyrak | |
| 2005/0167628 A1 * | 8/2005 | Gross | 251/285 |
| 2005/0202361 A1 | 9/2005 | Albizuri | |
| 2006/0175566 A1 | 8/2006 | Albizuri | |
| 2006/0201496 A1 | 9/2006 | Shingler | |
| 2007/0007482 A1 | 1/2007 | DeHaan | |
| 2007/0144589 A1 * | 6/2007 | Huang | 137/601.14 |
| 2007/0151606 A1 | 7/2007 | Querejeta | |
| 2007/0266765 A1 * | 11/2007 | Deng | 73/23.2 |
| 2007/0277803 A1 * | 12/2007 | Deng | 126/92 AC |
| 2007/0277812 A1 * | 12/2007 | Deng | 126/92 AC |
| 2007/0277813 A1 * | 12/2007 | Deng | 126/92 R |
| 2008/0138749 A1 | 6/2008 | Albizuri | |
| 2008/0149871 A1 * | 6/2008 | Deng | 251/142 |
| 2008/0149872 A1 * | 6/2008 | Deng | 251/142 |
| 2008/0156378 A1 | 7/2008 | Zhang | |
| 2008/0210309 A1 * | 9/2008 | Tan et al. | 137/119.04 |
| 2008/0227045 A1 | 9/2008 | Deng | |
| 2009/0235998 A1 | 9/2009 | Hsiao | |
| 2010/0035196 A1 * | 2/2010 | Deng | 431/278 |
| 2011/0089357 A1 * | 4/2011 | Tan et al. | 251/285 |

\* cited by examiner

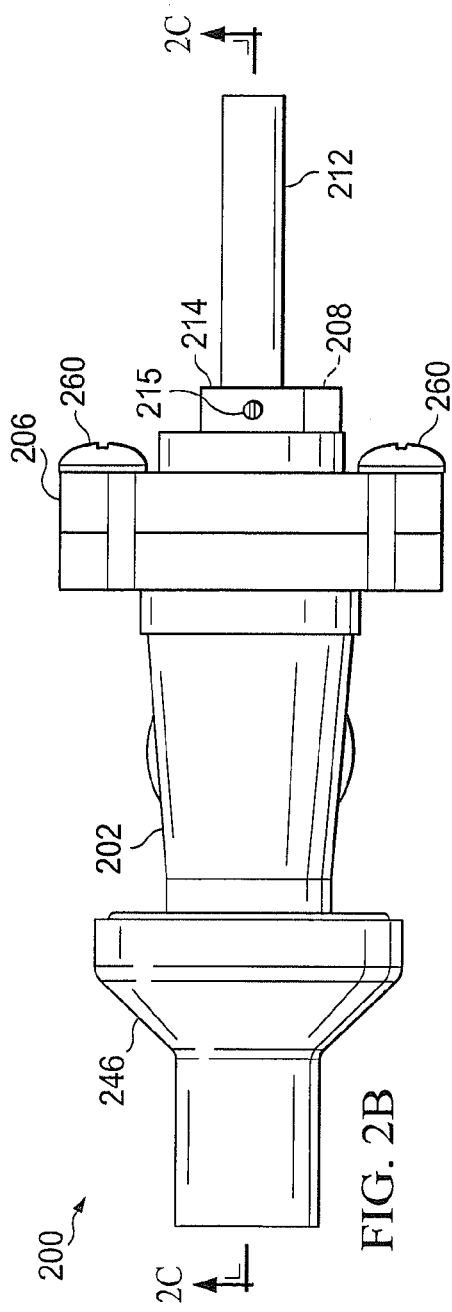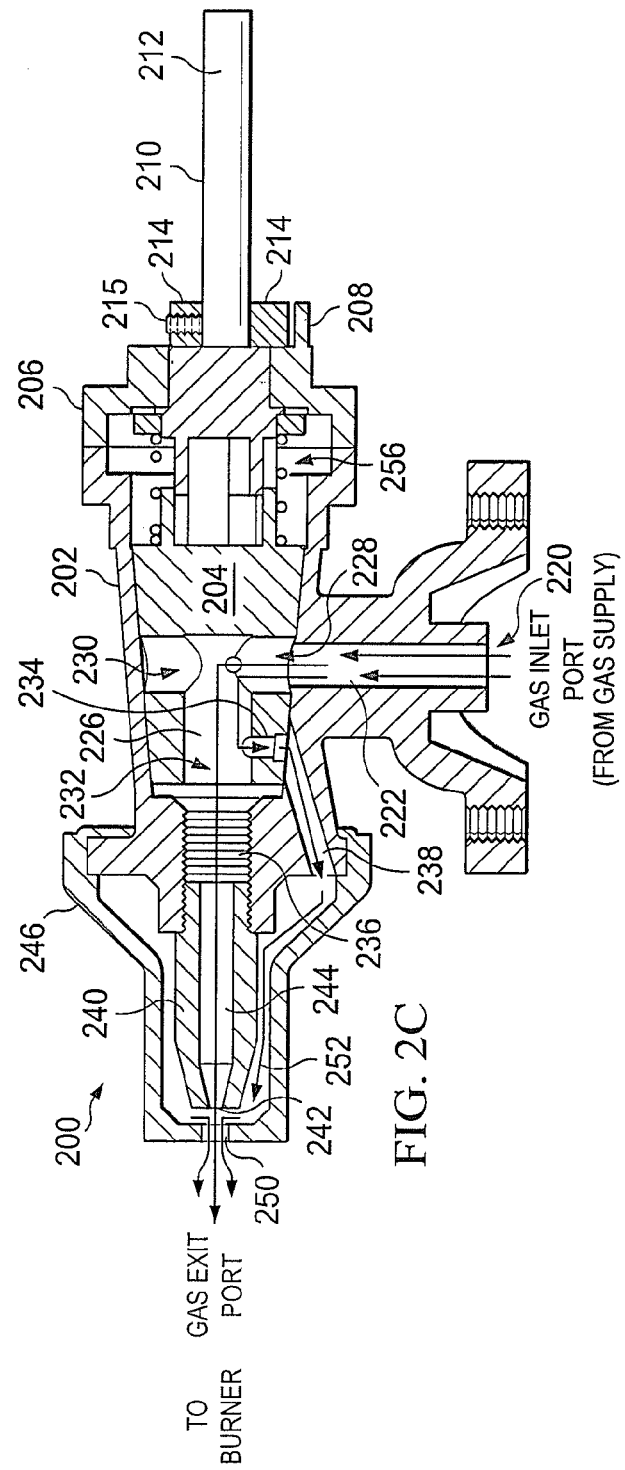
FIG. 2B
FIG. 2C

DUAL FUEL GAS VALVE AND GAS GRILL

CROSS-REFERENCE TO RELATED APPLICATION

This application is a continuation of U.S. patent application Ser. No. 12/082,812, filed Apr. 14, 2008, now U.S. Pat. No. 7,967,005 entitled "DUAL FUEL GAS VALVE AND GAS GRILL" which claims priority under 35 USC 119(e) to U.S. provisional Application Ser. No. 60/923,507 filed on Apr. 13, 2007, which are incorporated herein by reference.

TECHNICAL FIELD

The present disclosure relates generally to gas control valves, and more particularly to a dual fuel gas valve for various uses, including gas cooking grills.

BACKGROUND

The function, operation and elements of prior, art gas cooking grills are well-known. These gas grills utilize either liquid propane (LP) or natural gas (NG) as the gas source. Typically, in use, these gas grills include one or more gas control valves that control the flow of gas from the gas source to the burners. Normally, these gas control valves are structured and operate only to control one type of gas—either LP or NG. Thus, different gas control valves are needed depending on the gas source. In order to allow a consumer who purchases an LP gas grill or a NG gas grill to convert from one gas source to the other, certain manufacturers have made conversion kits available. Conversion kits normally include new and different gas control valves specifically for use with that particular type of gas. Thus, converting from one type of gas source to another is expensive and time-consuming.

Accordingly, there exists a need for new gas control valve that can be readily used to receive gas from dual sources (e.g., LP or NG) without the need for replacement of the gas valve or extensive conversion activities.

SUMMARY

In accordance with one embodiment, there is provided a gas control valve including a first inlet port operable for receiving gas from a gas source, an inner nozzle having a first orifice for outputting gas, and an outer nozzle having a second orifice for outputting gas, the second orifice adjacent the first orifice. A valve core includes one or more ports for receiving gas from the first inlet port and is structured to direct gas from the first inlet port through a by-pass chamber and through the second orifice when the valve core is in a first position, and direct gas through a first chamber and through the first orifice and the second orifice and not through the by-pass chamber when the valve core is in a second position.

In accordance with another embodiment, there is provided a method of converting a gas cooking grill from a first type of gas supply to a second type of gas supply using a duel fuel gas control valve. The method includes removing at least a portion of a removable restrictor mechanism from a first position, the restrictor mechanism restricting movement of a gas control valve within a gas cooking grill to a first predetermined range of motion when in the first position. The removed portion of the removable restrictor mechanism is installed into a second position, the restrictor mechanism restricting movement of the gas control valve to a second predetermined range of motion when in the second position.

In yet another embodiment, there is provided a gas grill including a plurality of gas burners and a plurality of gas control valves. Each gas control valve has an inlet port operable for receiving gas from a gas source, an inner nozzle having a first orifice for outputting gas, and an outer nozzle having a second orifice for outputting gas, the second orifice adjacent the first orifice. The valve further includes a valve stem coupled to a valve core having one or more ports for receiving gas from the first inlet port and structured to direct gas from the first inlet port through a by-pass chamber and through the second orifice when the valve core is in a first position, and direct gas through a first chamber and through the first orifice and the second orifice and not through the by-pass chamber when the valve core is in a second position. A plurality of restrictor mechanisms, each restrictor mechanism corresponding to one of the plurality of gas control valves and restricting rotational movement of the valve stem and valve core.

In still another embodiment, there is provided a gas control valve assembly for use in a gas cooking grill. The gas control valve assembly including a gas control valve with a valve core and having one or more gas inlet ports and one or more gas outlet ports. The assembly further includes a restrictor mechanism structured to restrict movement of the valve core to a first predetermined range of motion when the restrictor mechanism is in a first configuration and to restrict movement of the valve core to a second predetermined range of motion when the restrictor mechanism is in a second configuration.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 2A, 2B and 2C are perspective, side and cross-sectional views (taken along line C-C), respectively, of one embodiment of a gas control valve in accordance with the present disclosure;

DETAILED DESCRIPTION

Figure 1A:
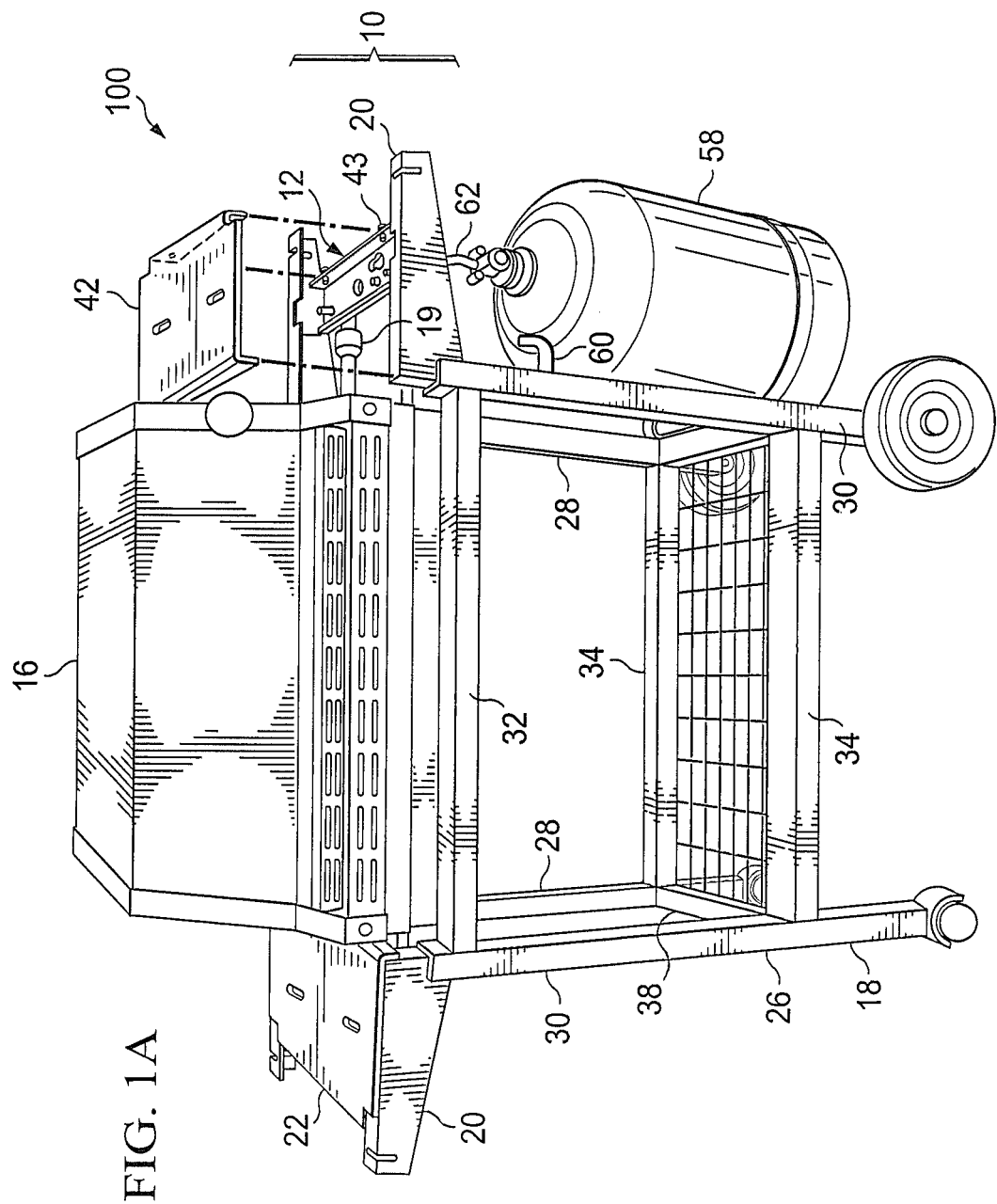
FIGS. 1A, 1B and 1C illustrate one embodiment of a gas cooking grill in accordance with the present disclosure.
Figure 1B:
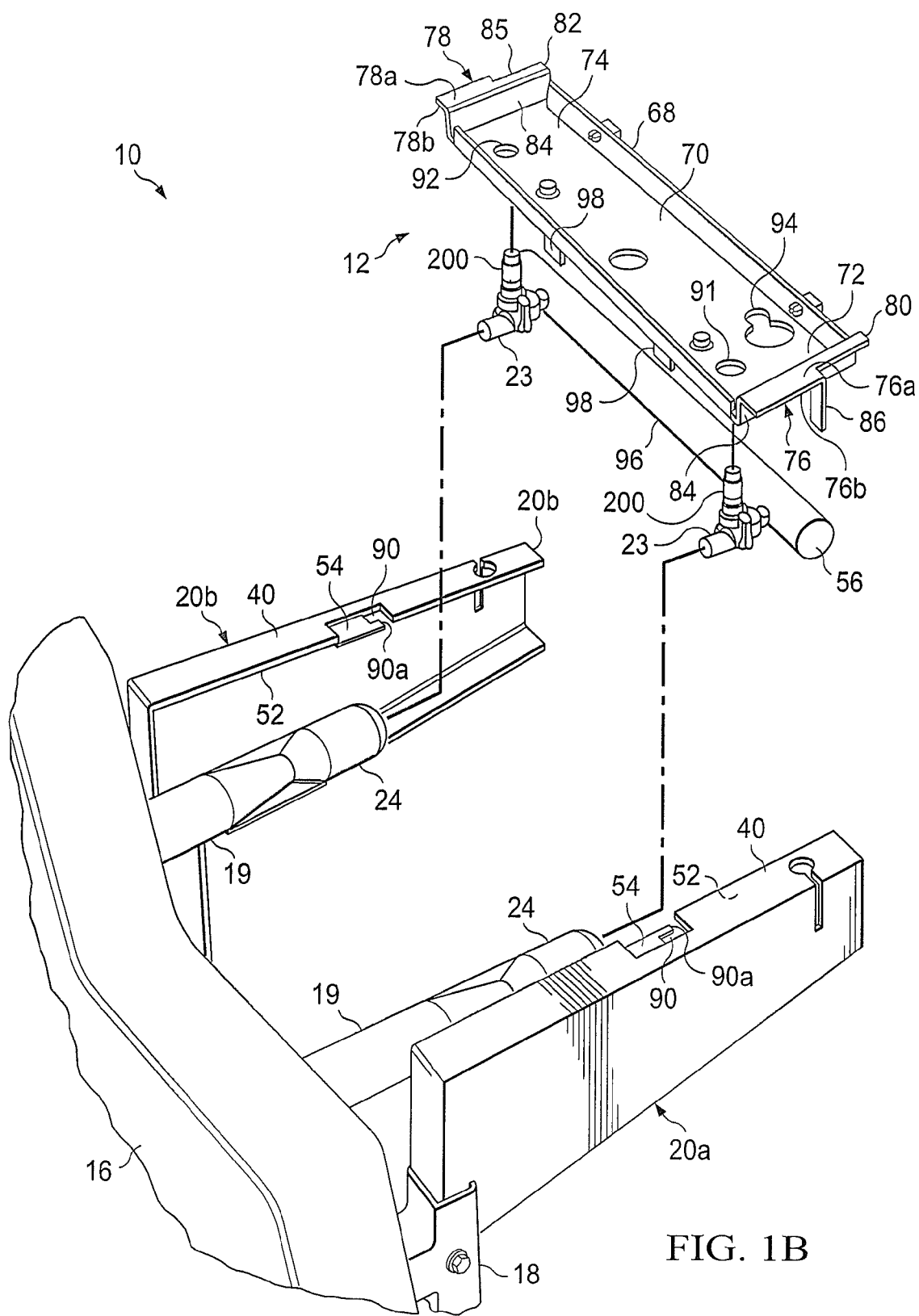
Figure 1C:
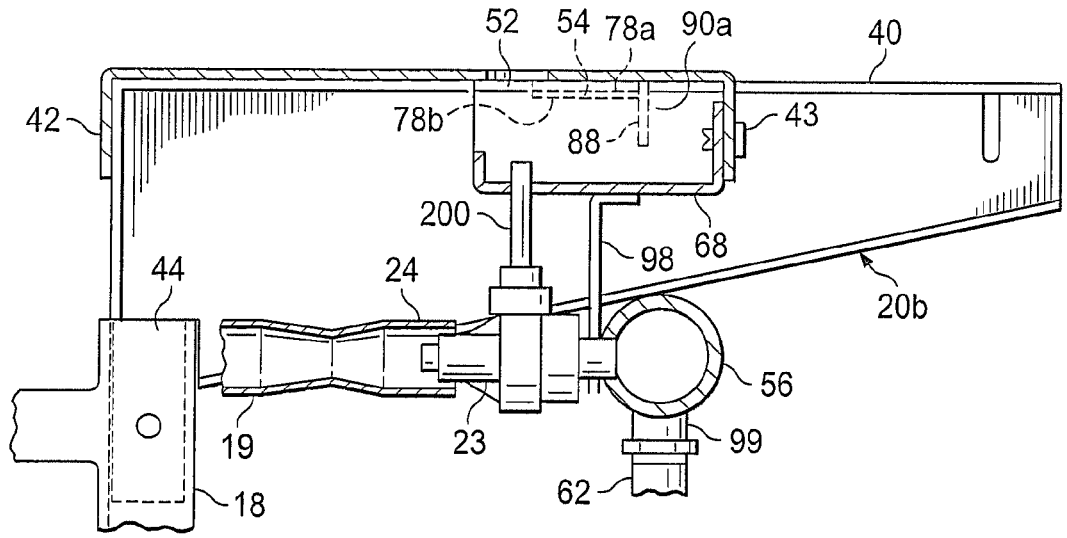

Certain aspects and embodiments of the gas grill and as control valve of the present disclosure are described in greater detail beginning with reference to FIG. 1. FIGS. 1A, 1B and 1C depict an illustrative embodiment of a gas cooking grill. The gas control valve described herein may be used with configurations and embodiments of a gas grill other than that shown in the FIGURES herein. In addition, the concepts, teachings and invention described herein may be used in different types of apparatus, in addition to gas cooking grills, in which it is useful for the apparatus to have the ability to utilize one of two (or more) types of gas from a gas source.

FIGS. 1A, 1B and 1C illustrate one embodiment of a gas cooking grill 100 in accordance with the present disclosure. The various elements shown therein are described in U.S. Pat. No. 6,131,562, which is fully incorporated herein by reference, except as noted. These elements are readily understood by those skilled in the art. Most of the elements shown are available in conventional prior art gas cooking grills currently available from one or more manufacturers.

Referring to the FIGS. 1A, 1B and 1C, there is shown a gas cooking grill 100 (gas barbeque grill assembly) including a gas supply system 10 and a gas manifold assembly 12. The gas cooking grill 100 shown includes a burner housing 16, a frame or support assembly 18 to support the burner housing 16, at least one burner 19 (a plurality), support members 20, a work surface 22. For ease of reference, the remaining text description of the structure shown in FIGS. 1A, 1B and 10 are not set forth specifically below, but are incorporated herein by reference from U.S. Pat. No. 6,131,562.

The gas container or tank 58 herein may be either a gas tank which holds gas, such as liquid propane (LP), or a source of gas supply, such as from a natural gas supply system. Thus, the gas grill 100 may receive gas from an LP gas container 58, such as shown in FIG. 1A, or a natural gas (NG) supply system (not shown). In either case, the gas transfer line 62 will receive gas from a gas source. It will be understood that one of the benefits of the gas cooking grill 100 described herein provides duel fuel operation—the ability to operate either one of two (or possibly more) types of gas, such as LP or NG.

The gas cooking grill 100 includes a novel gas control valve 200. The gas control valve 200 is structured to receive different types of gas (e.g., LP, NG) from a gas source and control the flow of that particular type of gas from the source to the gas burners of the gas cooking grill 100. Gas control valve 200 is configured to receive gas flow from an inlet port (which delivers either type of gas) and controls and outputs the gas flow to an outlet port. As will be appreciated, utilization of either an LP gas or NG source necessitates different control and operating conditions. It will also be understood by those skilled in the art that the gas control valve may have various stem configurations in relation to the gas outlet port—such as a 90 degree configuration (as shown in FIGS. 1B and 10), a 180 degree configuration (as shown in FIG. 2A-2C) or other angled configuration.

Figure 2A:
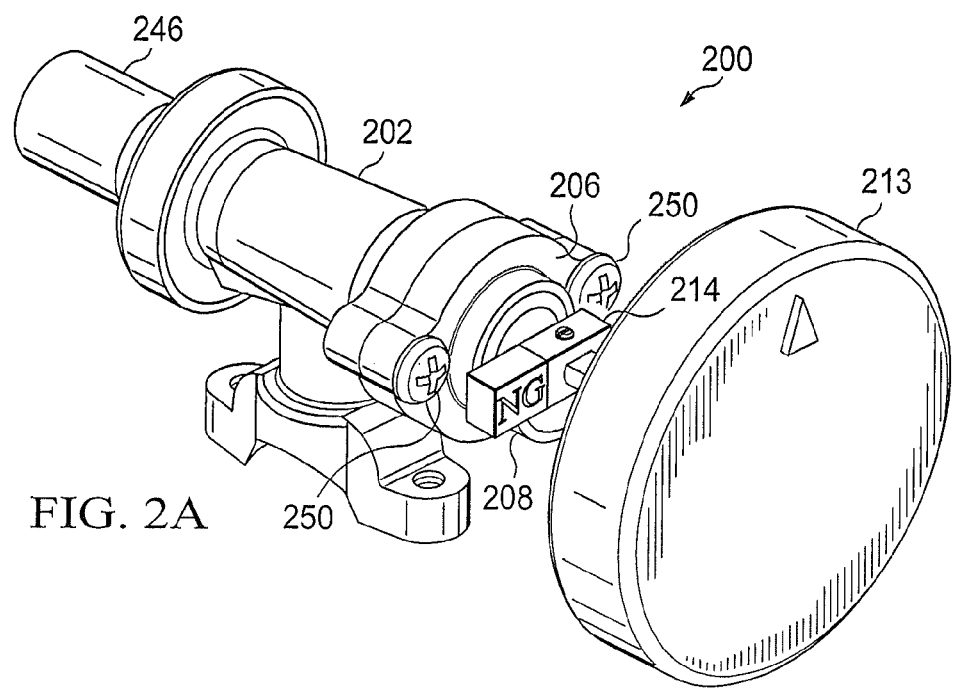

Now turning to FIGS. 2A, 2B and 2C, there is shown a perspective view, a side view and a cross-sectional view (taken along line C-C) of one embodiment of the gas control valve 200. The gas control valve 200 includes a valve body or housing 202 defining an interior volume that houses a valve core 204. A valve stem cap 206 is affixed to the housing 202 using one or more screws 260 and holds a valve stem 210 in place, as shown. The valve stem 210 is rigidly coupled to the valve core 204. The gas valve 200 includes a movement restrictor mechanism that restricts rotation or movement of the valve stem 210.

This restriction mechanism includes a stop extension 208 and a stop device 214 for restricting movement of valve stem 210. The valve stem cap 206 includes the stop extension 208 rigidly secured thereto, and the stop device 214 is removably secured to the valve stem 210. The stop extension 208 operates in conjunction with the stop device 214 to restrict rotational movement of the valve stem 210 (and hence the valve core 204) to a predetermined range, depending on the configurations of the stop extension 208 and/or the stop device 214. The stop device 214 shown is rectangular in shape and configured to accept a set screw 215 that rigidly, but removably, secures the stop device 214 to the valve stem 210. However other shapes and structures may be used for the stop device 214 and other mechanisms or methods may be used to removably secure or attach the stop device 214 to the valve stem 210. Additionally, the stop extension 208 may include one or two separate posts or extensions extending outward from the valve stem cap 206. In one embodiment, the extension 208 includes two separate posts, while in another embodiment, the extension 208 is constructed of a generally arcuate semi-circle shape (e.g., about 180 degrees). Other shapes and structures may be utilized.

The valve stem 210 includes a valve stem knob extension 212 having a semi-circular shape for receiving a burner knob 213. Various cross-sectional shapes and configurations may be used for the valve stem knob extension 212. The stop device 214 is secured to the valve stem 210 using the set screw 215. When assembled, the valve core 204 rotates as the burner knob 213 rotates and the stop extension 208 and the stop device 214 function and operate together to restrict rotational movement to a predetermined range. It may be possible for the stop extension 208 and stop device 214 to be integrated into one component or constructed using multiple components.

In an alternative embodiment (not shown), the stop extension 208 and the stop device 214 are positioned internally within the stem cap housing 206 (and/or housing 202), and operate in a similar fashion. However, for easier switching of the gas control valve 200 from a first mode to a second mode of control and flow of different gas supplies, it may be more beneficial for the stop extension 208 and the stop device 214 to remain externally located, as this may eliminate the need to remove the stem cap housing 206 from the housing 202 to accomplish mode switching.

Referring mainly to FIG. 2C (and with some reference to FIG. 3F), the housing 202 includes a gas inlet port 220 for receiving gas flow from a gas supply or container and a gas inlet passageway (chamber) 222 for porting the inlet gas to the valve core 204. The valve core 204 is structured to include an internal main gas flow chamber (passageway) 226. The valve core 204 also includes a first gas inlet port 228, a second gas inlet port 230, a first main gas outlet port 232 and a by-pass outlet port 234. The housing 202 defines and includes a main gas outlet chamber 236 and a by-pass chamber 238. The main gas outlet chamber 236 receives gas flow from the main gas flow chamber 226 of the valve core 204.

An inner nozzle 240 having an orifice 242 is affixed (e.g., threads, press fit, etc.) to the housing 202 for receiving gas flow through an inner nozzle chamber 244 from the main gas outlet chamber 236. The inner nozzle 240 is typically a conventional gas nozzle operable for use with LP gas and the orifice 242 is sized and dimensioned for a given BTU burner size for LP.

An outer nozzle 246 having an orifice 250 is coupled to the housing 202 for receiving gas flow through an outer nozzle chamber 252 from the by-pass chamber 238. The outer nozzle 246 is configured for use with NG and the orifice 250 is sized and dimensioned for a given BTU burner size for NG.

As shown, the outer nozzle 246 substantially surrounds the inner nozzle 240. The orifice 250 of the outer nozzle 246 is positioned adjacent, in line (e.g., longitudinally) and near with the orifice 242 of the inner nozzle 240. The orifice 250 is typically sized to be greater than the orifice 242, so as not to interfere with LP gas flowing through the inner nozzle 240 when the gas control valve is operating in the LP mode. For illustrative purposes only, in one example, the inner nozzle orifice 242 may be 0.5 mm, while the outer nozzle orifice 250 may be 0.6 mm. In addition, as shown, the center of the orifices 242, 250 are positioned along a longitudinal centerline of the inner nozzle 240. Any offset (as well as positing the orifices substantially far apart) may cause undesirable diffusion or diversion of the LP gas exiting the inner nozzle 240 in the LP mode. As such, the outer nozzle 246 includes inner threads therein to threadingly mate with corresponding threads on the housing 202. This assists with positioning the orifice 250 and outer nozzle 246. In another embodiment, the outer nozzle 246 may be press fit to the housing 202. Other attachment or coupling mechanisms may be used. Other structural configurations of the outer nozzle 246 may also be used.

The outer nozzle 246 (and orifice 250 and tip) provides a fixed orifice for use in delivering LP gas or natural gas. This nozzle 246 is "fixed" in the sense that no removal or insertion of the nozzle tip, or changing of the orifice, is necessary in order for the grill 100 to switch between fuel sources—LP gas and natural gas.

As will be appreciated, the dimensions of the chambers/passageways and orifices will generally depend on the ETU capability of the burners (not shown).

The general operation of the gas control valve 200 will now be described.

The arrows shown in FIG. 2C represent flow of gas in a first mode of operation—natural gas (NG) mode. In the natural gas mode, natural gas enters the gas inlet port 220 and flows through chamber 222 within the housing 202 toward the valve core 204. The position of the valve core 204 is such that the gas enters the main chamber 226 through the first gas inlet port 228. Gas flows out the gas outlet port 232, through the chamber 244, and is output through the orifice 242 of the inner nozzle 240. At the same time, gas flows through into the by-pass outlet port 234, through the separate by-pass chamber 238 and the outer nozzle chamber 252 towards the orifice 250 of the outer nozzle 246. Both gas flows then exit as a single flow through the orifice 250 of the outer nozzle 246.

It will be understood that in this mode, the gas control valve 200 provides gas flow (at least some, if not all gas flow) for natural gas to bypass the orifice 242 of the inner nozzle 240. Standard gas grills using a natural gas source are generally specified for operation at ¼ lbs/square inch (PSI) pressure for natural gas, while those using a LP source are generally specified for operation at ½ PSI for LP. Because the nozzle 240 is configured for LP operation, the nozzle 240 cannot be utilized alone when the gas source is switched to natural gas. Due to the lower pressure, the nozzle 240 will not produce enough natural gas flow rate to meet the gas requirements for the given BTU-sized burner. One known solution to this problem would be to remove and replace the nozzle 240 with a larger sized nozzle. However, due to safety issues, it is not desirable to require the nozzle and orifice portion of a gas control valve to be removed and replaced to switch gas sources (between LP and NG).

Thus, the gas control valve of the present disclosure provides a "fixed" outer nozzle 246 and orifice 250 that does not require replacement and can be used in both modes. Thus, the gas control valve 200 has an outer nozzle 246 that is fixed (may be replaced if inoperable, through use of thread couplings), but it is not removed or replaced in order to enable the dual fuel function described herein.

As the valve stem 210 (and the valve core 204) is rotated, registration of the gas inlet port 228 with the chamber 222 is reduced or enlarged, thereby providing the known multiple gas flow settings (OFF, LOW, MED, HIGH). Thus, in conjunction with the stop or restrictor device, described in additional detail below (and in FIGS. 3A-3D, 4A-43, 5A-5C), in the NG mode, the valve stem 210 (and valve core 204) has a predetermined first range of rotational movement that translates into control of NG flow through the gas control valve 200. Within this setting range and when gas actually flows, natural gas flows through the by-pass chamber 238 and out the universal orifice 250 of the universal or outer nozzle 246.

In another embodiment of the NG mode (not shown), the valve core 204 may be structured to provide natural gas flow through the by-pass chamber 238 while preventing gas flow through the chamber 244 of the nozzle 240. In this embodiment, it may be necessary for the minimum cross-sectional area at any given point within the by-pass chamber 238 to be equal to or greater than the cross-sectional area of the orifice 250 of the outer nozzle 246. An example of such an embodiment may be provided when the first inlet port 228 does not communicate with (blocks flow to) the main chamber 226, but communicates with a smaller chamber that further communicates with the by-pass chamber 238. In other words, the by-pass inlet port 238 would not communicate with the chamber 226, but would communicate with the smaller chamber (not shown) that is isolated from the chamber 226 (and the by-pass chamber 238 is configured to extend to the smaller chamber).

In a second mode of operation—the LP mode, LP gas enters the as inlet port 220 and flows through the chamber 222 within the housing 202 toward the valve core 204. The position of the valve core 204 is such that the gas enters the main chamber 226 through the second gas inlet port 230. Gas flows out the gas outlet port 232, through the chamber 244, and is output through the orifice 242 of the inner nozzle 240. In this position, the by-pass outlet port 234 is blocked, and no gas flows therethrough. The gas flow then exits the orifice 250 of the outer nozzle 246. As will be appreciated, the by-pass outlet port 234 is positioned and fixed within the valve core 204 relative to the first and second gas inlet ports 228, 230 to block gas flow into the by-pass chamber 238 when in the LP mode, and port gas into the by-pass chamber 238 when in the NG mode.

As the valve stem 210 (and the valve core 204) is rotated, registration of the second gas inlet port 230 with the chamber 222 is reduced or enlarged, thereby providing the known multiple gas flow settings (OFF, LOW, MED, HIGH). Thus, in conjunction with the stop or restrictor device, described in additional detail below (and in FIGS. 3A-3D, 4A-4E, 5A-5C), the LP mode, the valve stem 210 (and valve core 204) has a predetermined second range of rotational movement that translates into control of LP gas flow through the gas control valve 200.

Various configurations and structures for the gas control valve 200 are possible, other than that shown in the FIG- URES. Different and/or additional components may be provided within the gas valve 200 to perform various other functions, as readily apparent to those skilled in the art. For example, various components identified generally by reference numeral 256 may be included, such as one or more springs and restrictor mechanism(s) (requiring the burner knob/valve stem to be pushed inward to enable rotation). Such components and mechanisms and their operation are well-known and will not be further described herein. The duel fuel gas control valve 200 is structured to control gas flow for different types of gas originating from the gas supply (e.g., natural or LP gas) at the desired operating conditions based on conventional gas supply characteristics of the specific gas and gas grill requirements.

Figure 3A:
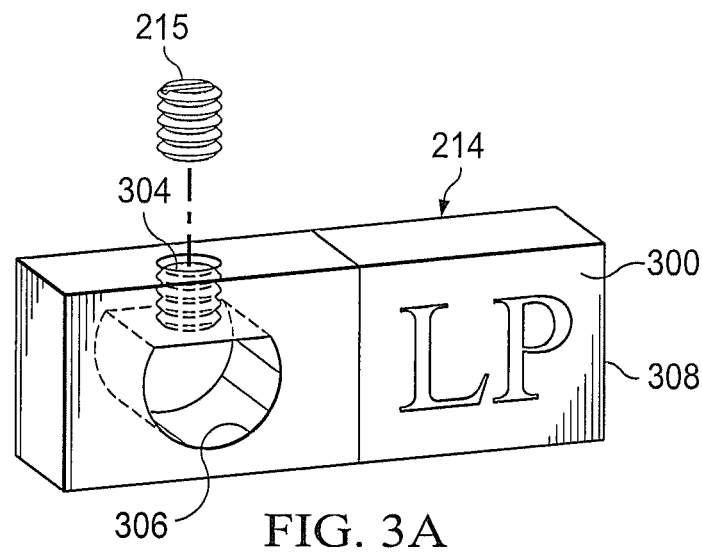
FIGS. 3A, 3B and 3C are perspective, front and back views, respectively, of one embodiment of a stop device in accordance with the present disclosure.
Figure 3B:
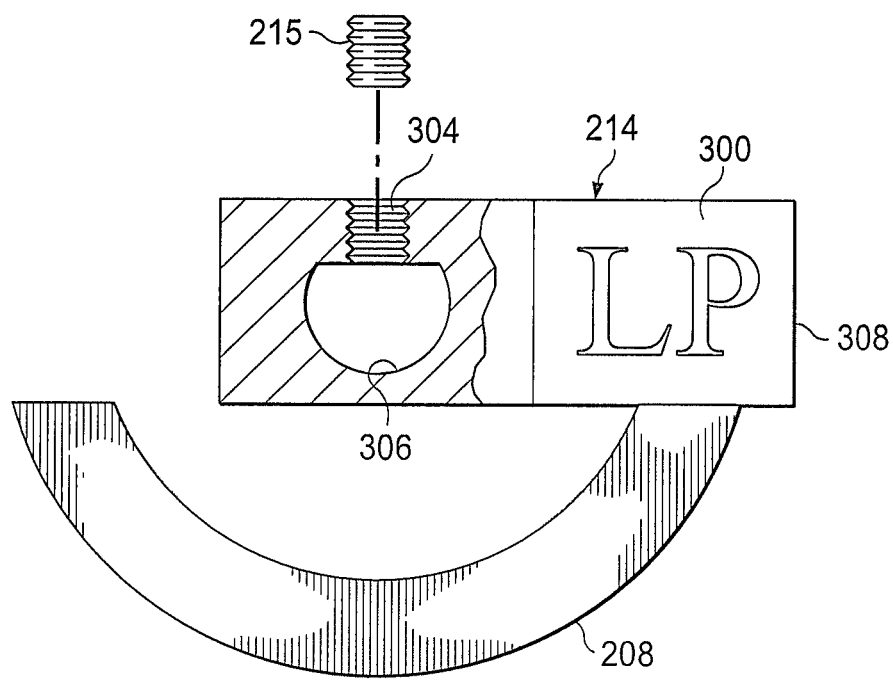
Figure 3C:
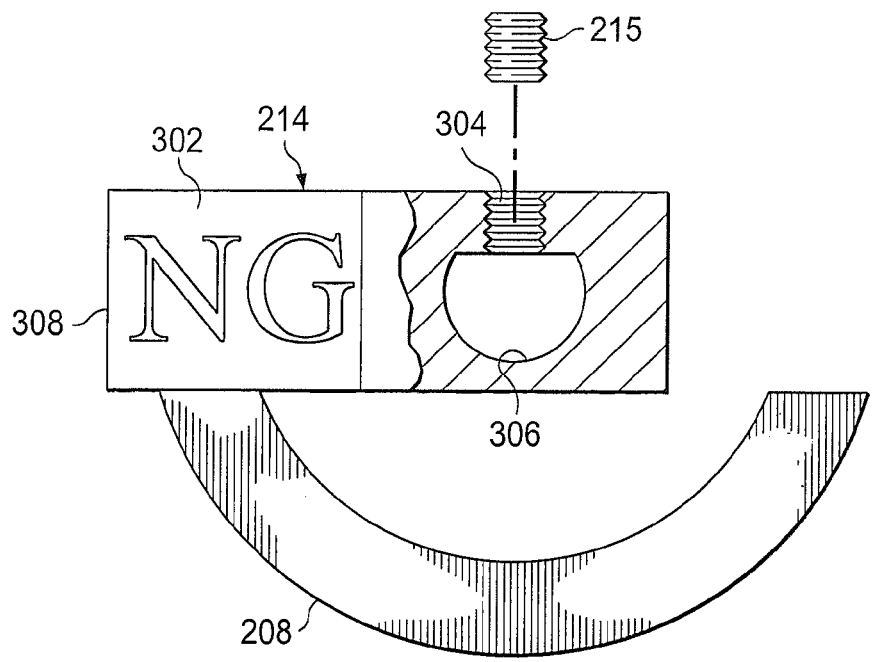

Now referring to FIGS. 3A, 3B and 3C, there is illustrated a perspective view (FIG. 3A) and front and back views (FIGS. 3B, 3C) of one embodiment of the stop device 214. The stop device 214 is substantially rectangular in shape and relatively flat. The stop device 214 includes a first side 300, a second side 302, an aperture or hole 304 for receiving the set screw 215, a valve stem burner extension groove or slot 306, and a stop extension end 308 extending outward from the main body of the stop device 214. As will be appreciated, the stop extension end 308 functions with the stop extension 208 of the valve stem cap 206 to restrict movement. The slot 306 is configured to substantially match the cross-sectional shape and configuration of the valve stem knob extension 212.

The first side 300 includes a nomenclature "LP" which indicates that this side 300 should be facing outward and viewable when the gas grill 100 (and the control valve 200) is used with a gas source supplying LP. Similarly, the second side 302 (i.e., flip side) includes a nomenclature "NG" which indicates that this side 302 should be facing outward and viewable when the gas grill 100 (and the control valve 200) is used with a gas source supplying natural gas. A consumer or other person may operably configure the gas grill 100 for the selected fuel or gas supply by removing the stop device 214, orienting it for LP or NG use, and replacing the stop device 214 (using the set screw 215). The designation "LP" and "NG" (or other similar designation) may be stamped, etched or otherwise affixed to the stop device 214 in visible form.

Figure 3D:
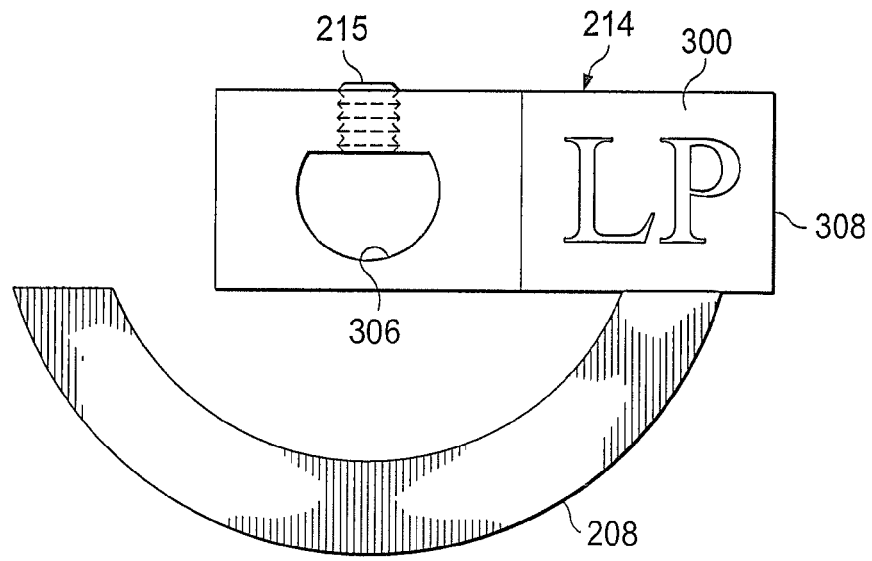
FIG. 3D is a frontal view of the stop device in relation to a stop extension of the gas valve.

Now referring to FIG. 3D, there is shown a frontal view of the stop device 214 in physical relation to the stop extension 208. As shown, due to the physical positioning, the burner knob (not shown in FIG. 3D) is rotatable within a range of approximately 180 degrees in the counterclockwise direction. When removed and oriented differently (flipped over and 180 degrees), the burner knob will be rotatable within a second range of approximately 180 degrees in the clockwise direction. It will be understood that the relative location of the edge of the stop extension 208 (or relative position of each post if two posts are utilized) will determine the range of the rotational movement for each of the first and second ranges. Each of these ranges could be more or less than 180 degrees, if desired, though the embodiment shown operates with ranges of movement of approximately 180 degrees for the NG mode and also for the LP mode.

Figure 3F:
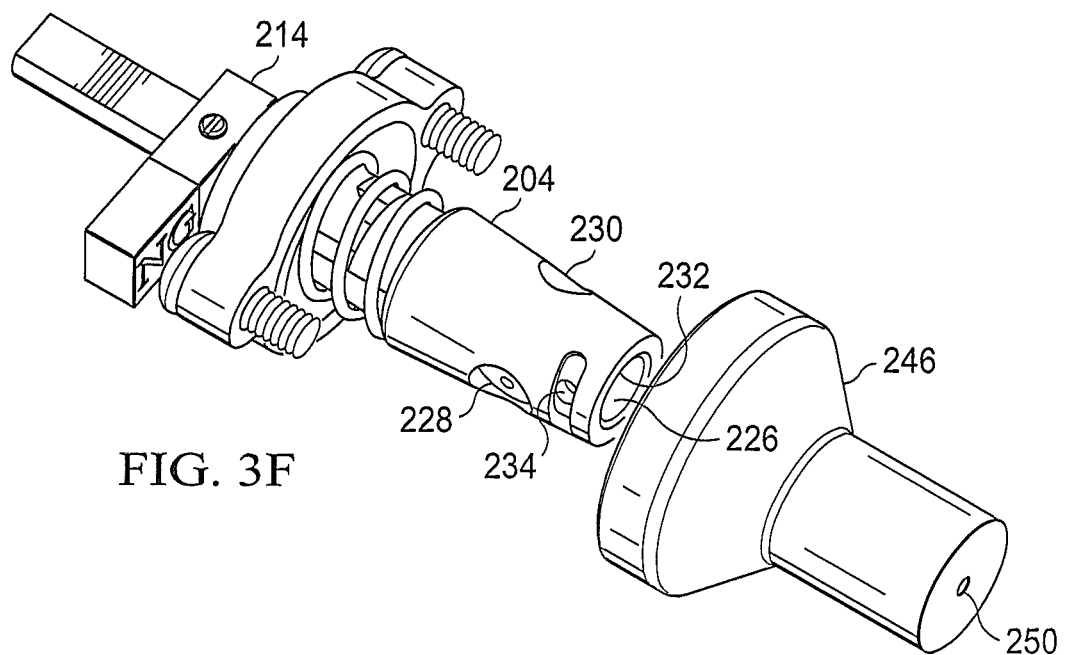
FIG. 3F is a perspective view of a gas valve excluding its housing (and nozzle) illustrating the stop device shown in FIGS. 3A-3C.

Now referring to FIG. 3F, there is shown a perspective view of the gas valve 200 excluding the housing 202 (and nozzle 240) utilizing the stop device 214 shown in FIGS. 3A-3D.

Figure 4A:
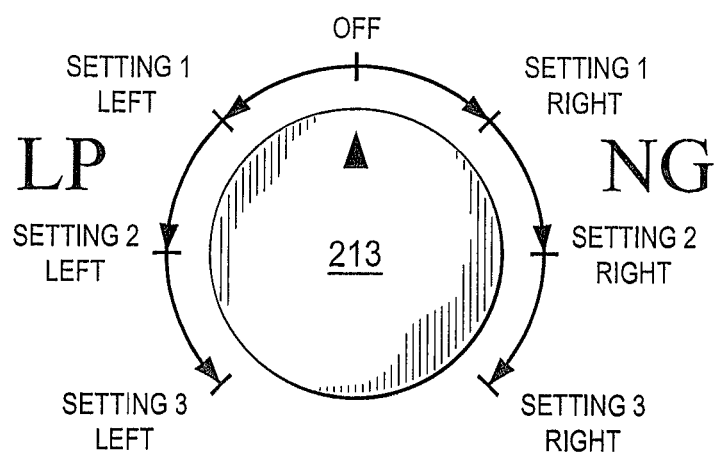
FIG. 4A illustrates an example range of positions or movement for the gas control valve for the stop device shown in FIGS. 3A-3D.
Figure 4B:
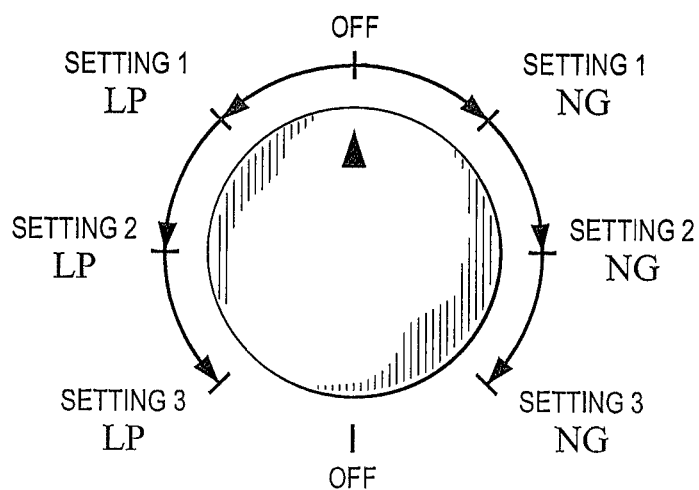
FIG. 4B illustrates another example range positions or movement.

Now referring to FIG. 4A, there is shown a range of positions or movement for the gas control valve 200 when used with the stop device 214 (and stop extension 208) shown in FIGS. 3A-3D. As shown, in the LP configuration, the knob 213 (and valve core 204) may be rotated along a first rotational range of movement (ranging from the OFF position through setting 1, setting 2 and setting 3 on the left side). In the NG configuration, the knob 213 (and valve core 204) may be rotated along a second rotational range of movement (ranging from the OFF position to the setting 1, setting 2 and setting 3 position on the right side). The settings 1, 2 and 3 may represent LOW, MED and HIGH settings (or HIGH, MED or LOW settings), respectively, for gas flow through the gas control valve 200. Other configurations may be used, such as LP setting 1 and NG setting 3 representing the HIGH setting, and LP setting 3 and NG setting 1 representing the LOW setting, etc. As will be appreciated, the gas flow operation and the settings configuration depend on the structural arrangement of the gas valve core 204 of the gas control valve 200. FIG. 4B illustrates a second configuration of rotational ranges which includes a second OFF position.

The gas control valve 200 provides gas flow control for a given type of gas supply when in a first operating position (or operating range) and a different gas flow control for a different type of gas supply when in a second operating position (or operating range). In other words, the knob may be turned through a first predetermined range for one type of gas supply (e.g., LP) and a second predetermined range for another type (e.g., NG). In the LP mode, the valve core 204 enables gas flow through a first passageway (e.g., no flow through a by-pass or additional second passageway) configured for LP gas flow between the gas inlet port 220 (or 228) and the gas outlet port 232 and nozzle 240 (that meets or has the desired or required gas flow operating characteristics or specifications for LP). In the NG mode, the valve core 204 enables gas flow through a second "by-pass" passageway configured for NG gas flow between the gas inlet port 220 (or 228) and the gas outlet port 232 (and through the by-pass chamber 238 into outer nozzle chamber 252) and nozzle 246 (that meets or has the desired or required gas flow operating characteristics or specifications for NG). In one embodiment, the NG flows through both the first passageway 226, 244 and the by-pass passageway 238, 252. In an alternative embodiment, the NG flows only through the by-pass passageway 238, 252.

Figure 5A:
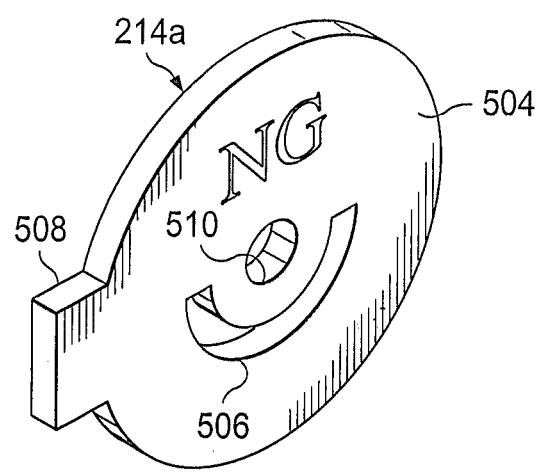
FIGS. 5A, 5B and 5C are perspective, front and back views of an alternative embodiment of the stop device in accordance with the present disclosure.
Figure 5B:
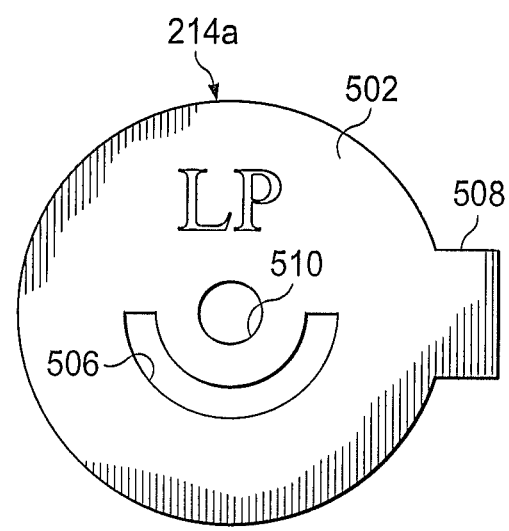
Figure 5C:
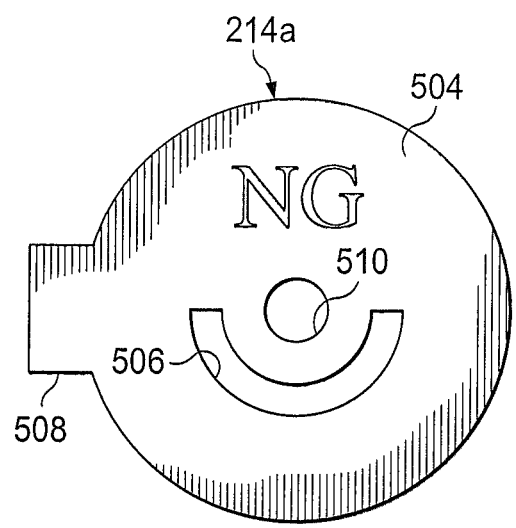

Now referring to FIGS. 5A, 5B and 5C, there is illustrated a perspective view (FIG. 5A) and front and back views (FIGS. 5B, 5C) of one alternative embodiment of the stop device 214a. The stop device 214a is substantially circular in shape and relatively flat. The stop device 214a includes a first side 502, a second side 504, an aperture or hole 510 for receiving a screw (not shown), a valve stem burner extension groove or slot 506, and a stop extension end or tab 508 extending outward from the main body of the stop device 214a. As will be appreciated, the stop extension end 508 functions with the stop extension 208 of the valve stem cap 206 to restrict movement. The slot 506 is configured to substantially match the cross-sectional shape and configuration of the valve stem knob extension 212.

Similar to device 214 shown in FIGS. 3A-3D, the first side 502 includes a nomenclature "LP" which indicates that this side 502 should be facing outward and viewable when the gas grill 100 (and the gas control valve 200) is used with a gas source supplying LP. Similarly, the second side 504 (i.e., flip side) includes a nomenclature "NG" which indicates that this side 504 should be facing outward and viewable when the gas grill 100 (and the control valve 200) is used with a gas source supplying natural gas. A consumer or other person may operably configure the gas grill 100 for the selected fuel or gas supply by removing the stop device 214a, orienting it for LP or NG use, and replacing the stop device 214a (using the screw 520 shown in FIG. 5D). The designation "LP" and "NG" (or other similar designation) may be stamped, etched or otherwise affixed to the stop device 214a in visible form.

Figure 5D:
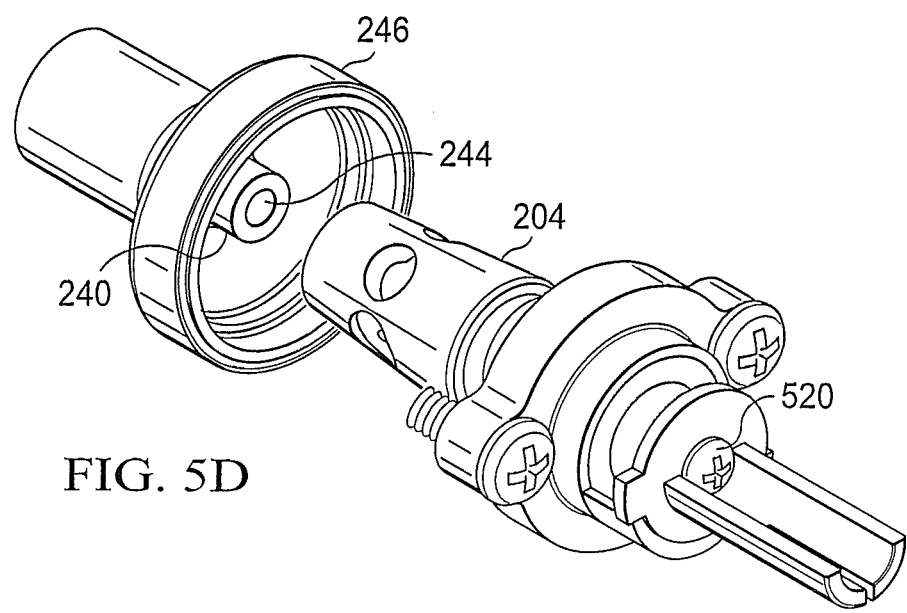
FIG. 5D is a perspective view of a gas valve excluding its housing 202 (and nozzle) illustrating the stop device shown in FIGS. 5A-5C.

Now referring to FIG. 5D, there is shown a perspective view of the gas valve 200 excluding the housing 202 (and nozzle 240) utilizing the stop device 214a shown in FIGS. 5A-5C.

Figure 6A:
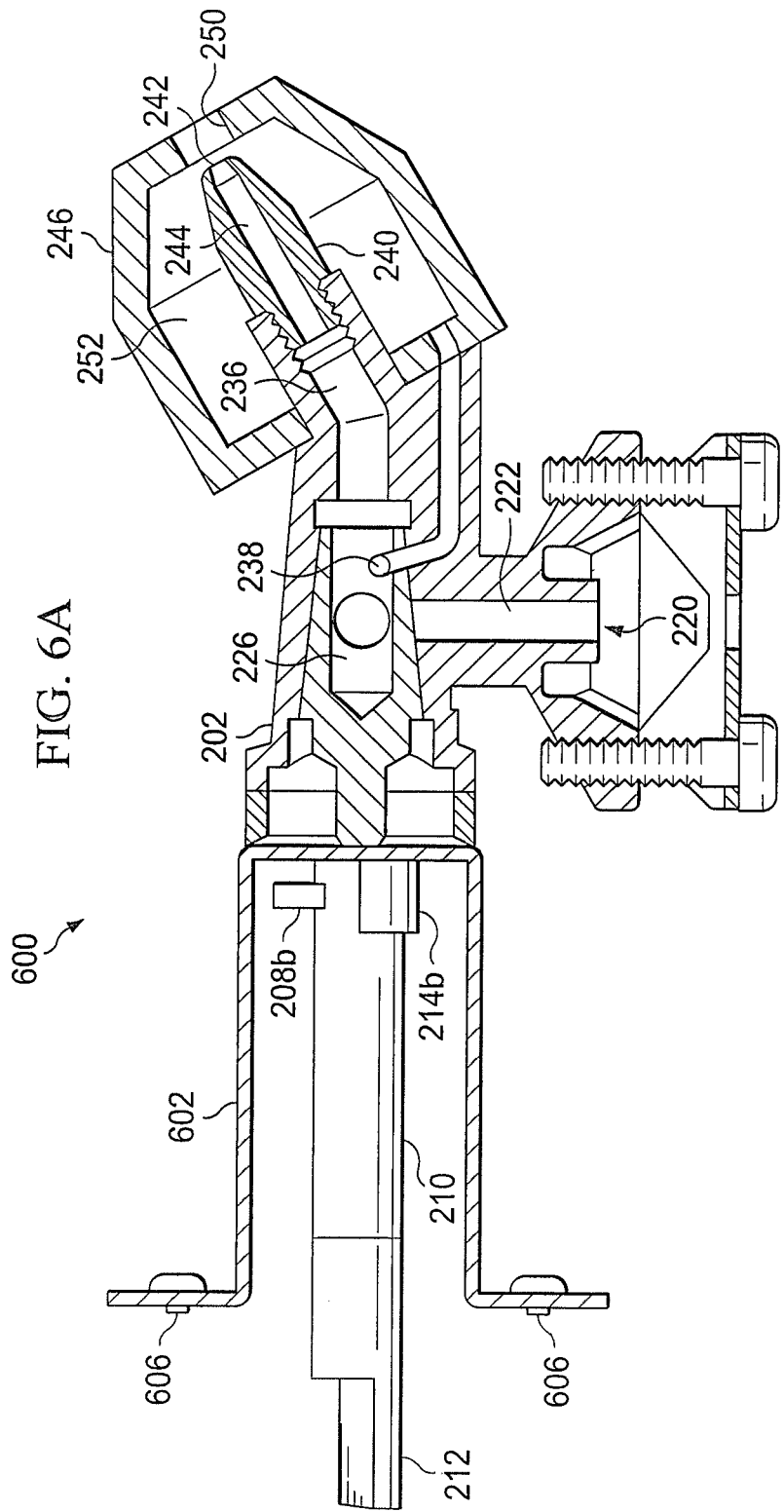
FIG. 6A is cross-sectional view of another embodiment of a gas control valve in accordance with the present disclosure.

Now referring to FIG. 6A, there is shown a different embodiment or configuration of a gas control valve 600 in accordance with the present disclosure. Gas control valve 600 includes various similar elements as set forth in FIGS. 2A-2C, as noted. This FIG. 6A illustrates that the concepts and teachings of the present disclosure may be used within gas valves having differing structural configurations.

As noted previously, the stop extension 208 may be integrated into the valve stem cap 206, or other shapes or structures may be utilized, to provide such function. In FIG. 6, the gas control valve 600 is shown secured to a gas valve mounting bracket 602 that includes a stop device 214b (may be affixed or attached to or integrated with the bracket 602). While gas valve 600 is shown, the gas valve 200 or other configurations of gas valves may be utilized in this embodiment. The bracket 602 includes an aperture 603 for receiving the valve stem 212 therethrough. Two apertures 604 are included to receive screws (not shown) for operably attaching the bracket to the gas valve 600. Other structures, means or methods known to those skilled in the art may be used for securing the bracket 602 to the gas valve 600. Outer flanges 606 of the bracket 602 include two apertures 604 with internal threading to receive screws (not shown) for operably attaching the bracket 602 to the gas grill body (such as a burner knob face plate). When attached, its position is fixed relative to the position of the gas control valve 600. Other structures and methods may be utilized.

In another embodiment (not shown), the bracket 602 and the gas valve 600 may each be independently secured to an intermediate mounting member (not shown), allowing for removal and repositioning of the bracket 602 from the intermediate mounting member without the necessity of removing the gas valve 600 from such mounting member (but still provided when attached, its position is fixed relative to the position of the gas control valve 600). This allows for repositioning of the bracket 602 while leaving the gas valve 600 secured to the body of the gas grill 100. Thus, the stop device 214b provides a removable restrictor mechanism.

A stop extension 208b (similar to the stop extension 208 described previously) is secured or attached to (or integrated with) the valve stem 210 adjacent the stop device 214b, such as in the form of a post or flange extending outward from the main body of the valve stem 210. The stop extension 208b and the stop device 214b function in combination (similarly or equivalently to the prior-described stop extension 208 and stop devices 214, 214a) to restrict movement of the valve stem (and knob) to a predetermined range of movement(s). Similar to other embodiments, the bracket 602 is removable and can be repositioned resulting in two modes of operation—one mode for NG and another mode for LP. This is accomplished by removing the bracket 602, rotating by 180 degrees, and re-installing the bracket 602. It will be understood that either or both of the stop devices 214 or stop extensions 208 may be positioned in one configuration for limiting or restricting valve movement to a first range and positioned in another configuration for a second range. In one embodiment, these two ranges may overlap, and in another embodiment they are substantially non-overlapping.

In general terms, when either the stop device 214 (in conjunction with its corresponding stop extension) is in a first position or mode, the gas valve 200, 600 operates to supply gas of a first type in accordance with a first range of movement of the gas control valve stem or knob. When in a second position or mode, the gas valve 200, 600 operates to supply gas of a second type in accordance with a second range of movement of the gas control valve step or knob. As described, one of the two components—either the stop extension or stop device—is configurable into different positions resulting in different modes of operation. It is possible that both components may be configurable into different positions at the same time, however, this may unnecessarily complicate the mode switching procedure by increasing the number of components repositioned. Thus, in the main embodiments, the stop extension 208, 208b is secured rigidly and permanently (not designed to be removable) to the valve stem 210.

Figure 6B:
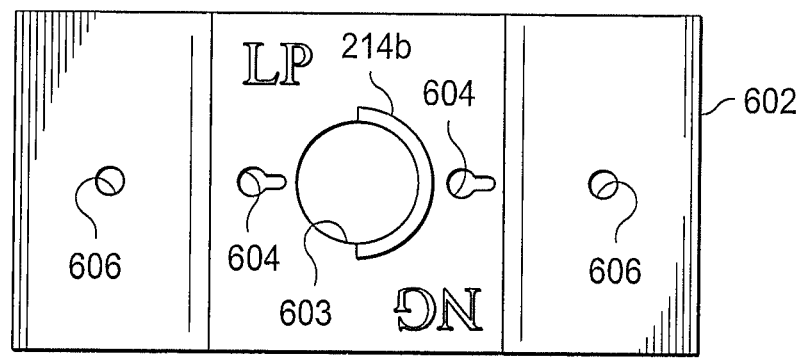
FIGS. 6B and 6C are front and perspective views of an alternative embodiment of a removable restrictor device in accordance with the present disclosure.
Figure 6C:
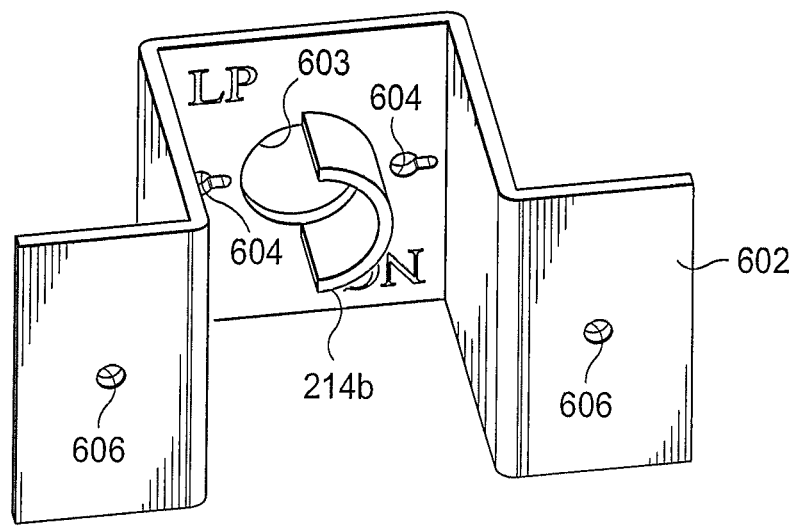

Now referring to FIGS. 6B and 6C, there are shown front and perspective views of the bracket 602. In the embodiment shown, the stop device 214b is constructed of a generally arcuate semi-circle shape (e.g., about or substantially 180 degrees). Other shapes and structures may be utilized, and in another embodiment, the stop device 214b may include one or two separate posts or extensions extending outward from the bracket 602. Similarly, the stop extension 208b is structured correspondingly to the structure of the stop device 214b to provide the desired operation and functioning described herein.

Figure 7A:
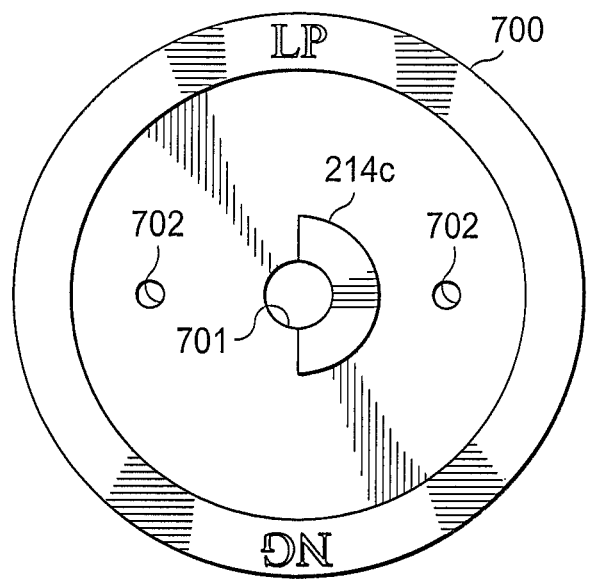
FIGS. 7A and 7B are front and perspective views of another embodiment of a removable restrictor device in accordance with the present disclosure.
Figure 7B:
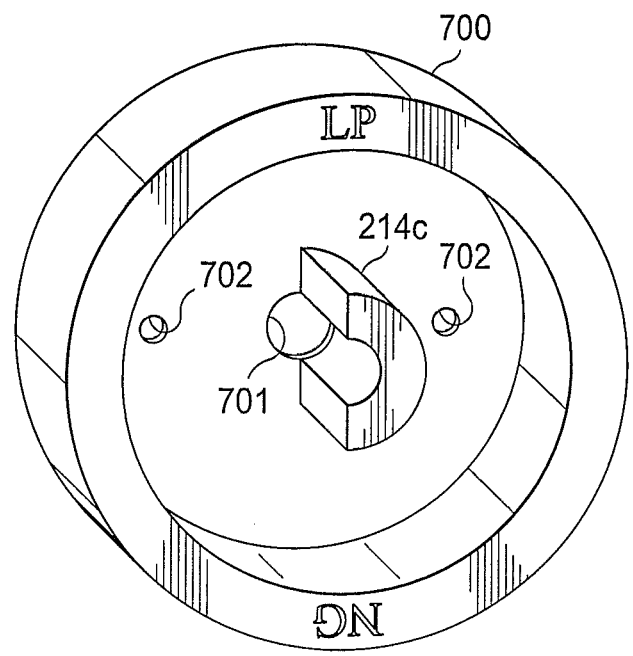

Now referring to FIGS. 7A and 7E, there are shown front and perspective views of an alternative embodiment, in the form of a gas knob bezel 700, that may be substituted or utilized in place of the above-described bracket 602. In this embodiment shown, the bezel 700 includes a stop device 214c constructed of a generally arcuate semi-circle shape (e.g., about or substantially 180 degrees). Other shapes and structures may be utilized, and in another embodiment, the stop device 214c may include one or two separate posts or extensions extending outward from the bezel 700. Similarly, the bezel 700 may be utilized in conjunction with the same or a similar stop extension 208b as described in conjunction with the bracket embodiment.

The bezel 700 includes an aperture 701 for receiving the valve stem 212 therethrough. Two apertures 702 are included to receive screws (not shown) for operably attaching the bezel to the gas valve 600 or the gas grill body (such as a burner knob face plate). Other structures, means or methods known to those skilled in the art may be used for securing the bezel 700 to the gas valve 600 or gas grill body.

Additionally, the bracket 602 (or bezel 700) may include one or more designations (e.g., "LP" and "NG") that indicate the correct orientation of the bracket 602 (or bezel 700) when the gas grill 100 (and the gas control valve 200, 600) is used with a gas source supplying LP or NG. A consumer or other person may operably configure the gas grill 100 for the selected fuel or gas supply by removing the bracket 602 (or bezel 700), orienting it for LP or NG use, and replacing the bracket 602 (or bezel 700). The designation "LP" and "NG" (or other similar designation) may be stamped, etched or otherwise affixed to the bracket 602 (or bezel 700) in visible form, as shown in FIGS. 6B, 6C, 7A and 7B. Thus, the stop devices 214b, 214c are removably affixed in a first position or a second position and fixed in those positions relative to the gas control valve body (or valve core).

In general operation, the gas cooking grill 100 can be converted from a first type of gas supply to a second type of gas supply using the duel fuel gas control valve 200, 600 and/or other components described herein. At least a portion of the removable restrictor mechanism is removed or de-installed from a first position. In the first position, the restrictor mechanism restricts movement of the gas control valve within the gas cooking grill to a first predetermined range of motion. The removed portion is then re-installed or repositioned into a second position wherein the restrictor mechanism restricts movement of the gas control valve to a second predetermined range of motion. In one embodiment, the repositioning or re-installation (or orientation) of the stop devices 214 may be defined as reversing the device 214 (in order to allow two modes of operation).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of converting a gas cooking grill from a first type of gas supply to a second type of gas supply using a duel fuel gas control valve, the method comprising:
removing at least a portion of a removable restrictor mechanism from a first position, the restrictor mechanism restricting movement of a gas control valve within a gas cooking grill to a first predetermined range of motion when in the first position;
installing the removed portion of the removable restrictor mechanism into a second position, the restrictor mechanism restricting movement of the gas control valve to a second predetermined range of motion when in the second position;
reversing the removed portion of the restrictor mechanism prior to installing.

2. The method in accordance with claim 1 wherein the first type of gas supply is natural gas and the second type of gas supply is liquid propane gas, and the gas control valve comprises:
an inner nozzle having a first orifice for outputting gas;
an outer nozzle having a second orifice for outputting gas, the second orifice adjacent the first orifice; and
a valve core having one or more ports for receiving gas from a first inlet port and structured to direct natural gas from the first inlet port through a by-pass chamber and through the second orifice when the valve core is in a first position, and direct liquid propane gas through a first chamber and through the first orifice and the second orifice and not through the by-pass chamber when the valve core is in a second position.

3. The method in accordance with claim 1 wherein the first predetermined range of motion overlaps the second predetermined range of motion.

4. The method in accordance with claim 1 wherein the first predetermined range of motion is substantially non-overlapping with the second predetermined range of motion.

5. The method in accordance with claim 4 further comprising:
providing a first visible indicia to identify when the portion of the restrictor mechanism is in the first position and a second visible indicia to identify when the portion of the restrictor mechanism is in the second position.

6. A gas control valve comprising:
a first inlet port operable for receiving gas from a gas source;
an inner nozzle having a first orifice for outputting gas;
an outer nozzle having a second orifice for outputting gas, the second orifice adjacent the first orifice;
a valve core having one or more ports for receiving gas from the first inlet port and structured to direct gas from the first inlet port through a by-pass chamber and through the second orifice when the valve core is in a first position, and direct gas through a first chamber and through the first orifice and the second orifice and not through the by-pass chamber when the valve core is in a second position;
means for restricting movement of the valve core to a first predetermined range in a first mode of operation and for restricting movement of the valve core to a second predetermined range in a second mode of operation, the means for restricting comprising a stop device;
wherein the first mode of operation is a natural gas mode and the second mode of operation is a liquid propane mode; and
wherein the stop device comprises:
a first side having a first indicia indicating the first mode of operation, and
a second side having a second indicia indicating the second mode of operation.

7. The gas control valve in accordance with claim 6 wherein the stop device restricts movement of the valve core to the first predetermined range in the first mode of operation and restricts movement of the valve core to the second predetermined range in the second mode of operation.

8. The gas control valve in accordance with claim 7 wherein the stop device is removably secured to a valve stem rigidly coupled to the valve core, the stop device comprises a stop extension rigidly secured to a housing of the gas control valve, and the stop device rotates in association with the valve stem.

9. A gas control valve comprising:
a first inlet port operable for receiving gas from a gas source;
an inner nozzle having a first orifice for outputting gas;
an outer nozzle having a second orifice for outputting gas, the second orifice adjacent the first orifice;
a valve core having one or more ports for receiving gas from the first inlet port and structured to direct gas from the first inlet port through a by-pass chamber and through the second orifice when the valve core is in a first position, and direct gas through a first chamber and through the first orifice and the second orifice and not through the by-pass chamber when the valve core is in a second position;
a restrictor mechanism coupled to the valve core and operable for restricting movement of the valve core to a first predetermined range including the first position of the valve core when the restrictor mechanism is in a first position and restricting movement of the valve core to a second predetermined range including the second position of the valve core when the restrictor mechanism is in a second position, wherein the restrictor mechanism comprises:
a stop device removably secured to a valve stem rigidly coupled to the valve core,
a stop extension rigidly secured to a housing of the gas control valve, and wherein the stop device rotates in association with the valve stem;
wherein the stop device restricts movement of the valve core to the first predetermined range in a first mode of operation and restricts movement of the valve core to the second predetermined range in a second mode of operation; and
wherein the first mode of operation is a natural gas mode and the second mode of operation is a liquid propane mode; and
wherein the stop device comprises:
a first side having a first indicia indicating the first mode of operation, and
a second side having a second indicia indicating the second mode of operation.

10. The gas control valve in accordance with claim 9 wherein the first predetermined range is about 180 degrees or less and the second predetermined range is about 180 degrees or less.

11. The gas control valve in accordance with claim 10 wherein the first predetermined range and the second predetermined range are substantially non-overlapping.

12. A gas grill comprising:
a plurality of gas burners;
a plurality of gas control valves, each gas control valve comprising,
an inlet port operable for receiving gas from a gas source,
an inner nozzle having a first orifice for outputting gas,
an outer nozzle having a second orifice for outputting gas, the second orifice adjacent the first orifice,
a valve core having one or more ports for receiving gas from the first inlet port and structured to direct gas from the first inlet port through a by-pass chamber and through the second orifice when the valve core is in a first position, and direct gas through a first chamber and through the first orifice and the second orifice and not through the by-pass chamber when the valve core is in a second position, and
a valve stem coupled to the valve core; and
a plurality of restrictor mechanisms, each restrictor mechanism corresponding to one of the plurality of gas control valves and restricting rotational movement of the valve stem and valve core for restricting movement of the valve core to a first predetermined range including the first position of the valve core when the restrictor mechanism is in a first position and restricting movement of the valve core to a second predetermined range including the second position of the valve core when the restrictor mechanism is in a second position, wherein each restrictor mechanism comprises:
a stop device removably secured to the valve stem and rotatable in association with the valve stem, and the stop device comprises:
a first side having a first indicia indicating a first mode of operation, and
a second side having a second indicia indicating a second mode of operation.

13. The gas grill in accordance with claim 12 wherein the stop device restricts movement of the valve core to the first predetermined range in the first mode of operation and restricts movement of the valve core to the second predetermined range in the second mode of operation.

14. The gas grill in accordance with claim 13 wherein the first mode of operation is a natural gas mode and the second mode of operation is a liquid propane mode.

\* \* \* \* \*